United States Patent Office 3,528,262
Patented Sept. 15, 1970

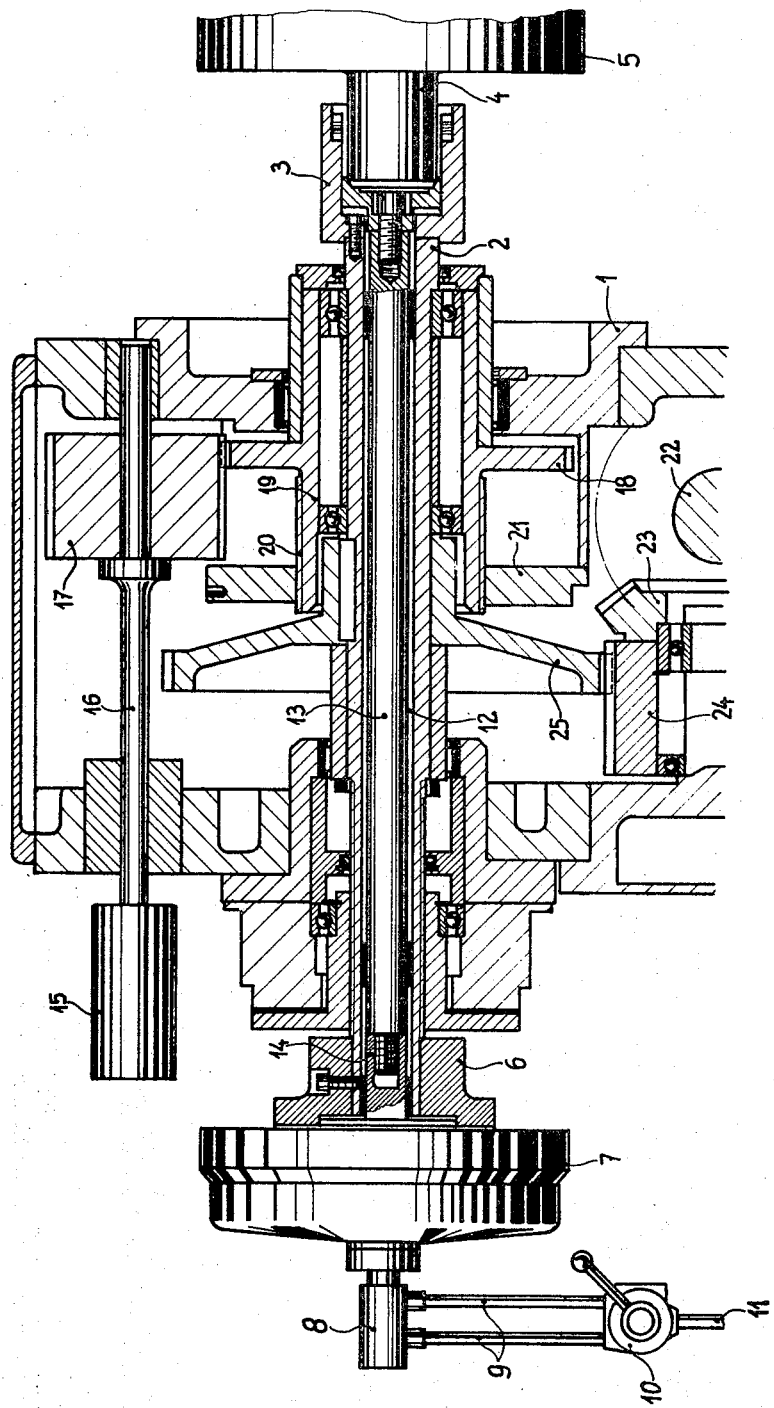

3,528,262
AUTOMATIC COUPLING FOR THE PLATE CYLINDER DRIVE OF A ROTARY PRESS
Boris Fuchs, Ittigen, near Bern, Switzerland, assignor to Winkler Fallert & Co. AG, Bern, Switzerland
Filed Apr. 16, 1968, Ser. No. 721,781
Claims priority, application Sweden, Apr. 18, 1967, 5,399/67
Int. Cl. F16c 3/00
U.S. Cl. 64—1  3 Claims

ABSTRACT OF THE DISCLOSURE

A coupling is provided by a fast acting chuck arranged to engage the spindle bearing of a plate cylinder. The chuck is mounted on an axially movable spindle in a drive housing. Pneumatically operated means are secured to the drive housing for opening and closing the chuck. In addition, a motor and gear means are arranged on the drive housing for moving the spindle and the check attached to it in the axial direction for withdrawing and replacing the chuck on the spindle bearing of the plate cylinder.

SUMMARY OF THE INVENTION

This invention is directed to a coupling for the plate cylinder drive of rotary presses, such as photogravure presses, and, more particularly, it is directed to a fast-acting chuck which can be automatically removed from the plate cylinder drive.

In one known device, a gear is mounted on the plate cylinder shaft and it is necessary to remove the gear when changing the plate cylinder. In addition to the difficulties involved in removing the gear, the lubrication in such an arrangement is inadequate.

In another device, a toothed clutch is provided on the end of the plate cylinder shaft and it must be removed each time the plate cylinders are changed.

Still another device which has been used for mounting the plate cylinder drive is the socalled split coupling where one half of the coupling is hinged. This coupling arrangement has the following disadvantages:

(1) The plate cylinder can only be changed when the hinged split coupling is in a certain position, and
(2) The clamping action must be achieved by manual means.

Further, another coupling device is set forth in German Pat. No. 1,005,977 and discloses a clutch positioned between the drive shaft and the plate cylinder. The outer coupling half disposed on the drive shaft radially spans the inner coupling half fixed on the end of the plate cylinder shaft and is axially locked to it by means of latches arranged to be oscillated in the radial direction in the outer coupling half. In this arrangement, when the plate cylinders are being changed, the inner coupling half must be removed with the latches in an outwardly pivoted position.

For presetting its circumferential register, the plate cylinder must be adjusted very accurately in its angular position in relationship to the etching (printing plate). Neither of the above-mentioned hinged split coupling and toothed clutch permit exact adjustment. The hinged split coupling rotates as the plate cylinder is closed and the toothed clutch permits adjustment only within one calibration.

Therefore, it is a primary object of the present invention to provide a coupling for the plate cylinder drive of a rotary press which can be automatically removed and replaced on the plate cylinder drive in a fast and simple operation.

It is another object of the invention to provide a fast acting chuck as the automatic coupling with automatic means for opening and closing the chuck on the plate cylinder drive and for displacing it axially from the drive for changing the plate cylinder.

Another object of the invention is to utilize pneumatically operated means for moving the chuck into its opened and closed positions.

Still another object of the device is to provide a motor and gear arrangement for moving the chuck axially relative to the plate cylinder drive.

Moreover, another object of the invention is to afford a coupling which is automatic in operation, easy to manipulate, and affords accurate adjustment of the plate cylinder.

In accordance with the present invention, the disadvantages mentioned above for previously known coupling devices are eliminated by providing a fast-acting chuck on one end of a spindle which is movable in an axial direction onto the spindle bearing of a plate cylinder. The spindle containing the chuck is mounted in a drive housing and a bore extends through the spindle from the chuck to the opposite end of the housing. A pneumatic cylinder is mounted by means of a flange onto the housing at the end of the bore remote from the housing. The pneumatic cylinder is arranged to rotate with the spindle and control means are provided for directing compressed air into the cylinder. Within the bore, a rod extends from the chuck to the end adjacent the pneumatic cylinder and by controlling the compressed air admitted to the pneumatic cylinder, the rod, which acts as a piston at its end adjacent the pneumatic cylinder, is arranged to open and close the chuck. A gear arrangement is mounted on the drive housing to provide a reciprocating axial movement to the spindle so that the chuck may be moved toward and away from the plate cylinder drive. The gear arrangement includes a motor equipped both for high speed and fine adjustment operation with one gear being driven from the motor. This gear drives another gear mounted for free rotation on the spindle of the drive housing. The second gear has a hub in threaded engagement with a nut attached to the drive housing whereby in response to the direction of the rotation provided by the motor, the hub together with the second gear, the spindle 6 and the check can be moved axially relative to the plate cylinder drive.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The drawing is an elevational view, partly in section, of a device embodying the present invention.

DETAILED DESCRIPTION OF THE INVENTION

In the drawing, a drive housing 1, contains a rotatably mounted spindle 2 having a fast-acting chuck 3 attached to one end. The chuck 3 is movably secured to the spindle bearing 4 of a plate cylinder 5 only a portion of which is illustrated. Positioned on the opposite end of the spindle 2 from the chuck 3 is a flange 6 on which is mounted a pneumatic cylinder 7. The pneumatic cylinder is rotatable with the spindle and is connected through an air feeder device 8 with a pair of conduits 9, both of which are connected to a control valve member 10 to which compressed air is supplied through a line 11 from a source, not shown. Extending axially through the spindle from the chuck 3 to the pneumatic cylinder 7 is a bore 12 within which a tension rod 13 is positioned. The tension rod 13 is connected at one end to the chuck 3 and at its other end forms a piston 14 upon which the air supplied through the pneumatic cylinder operates for opening and closing the chuck.

For the axial movement of the chuck, a gear arrangement is mounted on the drive housing 1 and consists of a motor 15 equipped both for high speed and fine adjustment operation which is connected through a shaft 16 with a spur gear 17. The spur gear 17 is in meshed engagement with another spur gear 18 which is freely rotatable on the spindle and has a hub 19 threaded along a surface 20. The threaded surface 20 is in engagement with a nut 21 fixed to the drive housing 1.

The drive for rotating the spindle 2 and, in turn, the chuck 3 and the plate cylinder 5 is provided by means of a longitudinally extending shaft 22, bevel gearing 23, and the gears 24 and 25 which form a part of the drive housing 1.

DESCRIPTION OF THE OPERATION OF THE INVENTION

When it is desired to change the plate cylinder 5 with the chuck 3 in position on its spindle bearing 4, the chuck is opened by actuating the control cock 10 which supplies compressed air through the pneumatic cylinder 7 to act on the piston end 14 of the rod 13 and thereby open the chuck. Next, a switch (not shown) operates the motor 15 for high speed operation driving the spur gear 17 and, in turn, spur gear 18. The hub 19 of gear 18 rotates and due to the engagement between its threaded surface 20 and the nut 21, the spindle 2 with the chuck 3 is displaced axially away from the spindle bearing of the plate cylinder, and the plate cylinder may be removed and replaced. The automatic operation of the chuck greatly facilitates the removal of the plate cylinder.

After the insertion of a replacement plate cylinder in the rotary press, the motor 15 drives the gears 17, 18 and moves the spindle 2 and chuck 3 back onto the end of the spindle bearing. When in position, the control valve member 10 is actuated and the compressed air fed through the pneumatic cylinder into the bore operates on the piston 14 of the tension rod 13 causing the chuck to close on the spindle bearing 4.

The fine adjustment speed provided by the motor 15 serves to control the side register of the plate cylinder.

It will be appreciated that electrically operated means could be used to replace the pneumatic means for opening and closing the chuck without departing from the concept of the invention. Further, other means in addition to those shown in the drawing may be used for the moving of the chuck axially without departing from the scope of the invention.

While a specific embodiment of the invention has been shown and described in detail to illustrate the application of the inventive principles, it will be understood that the invention may be embodied otherwise without departing from such principles.

What is claimed is:

1. A coupling device for a plate cylinder in a rotary press, such as photogravure press, is comprised of a chuck arranged to be secured to a plate cylinder drive element, means for rotatably supporting said chuck, said support means for said chuck comprises a drive housing, a spindle rotatably mounted in said drive housing and arranged to extend in the axial direction of the plate cylinder, said chuck secured to one end of said spindle, means associated with said support means for opening and closing said chuck, said means for opening and closing said chuck comprises said spindle having an axially extending bore therethrough, a rod extending through said bore and connected at one end to said chuck, means arranged at the opposite end of the bore from said chuck for axially displacing said rod and moving said chuck between its opened and closed positions, and means associated with said support means for axially moving said chuck, after it is opened, so that it can be moved axially relative to the plate cylinder drive element for effecting the replacement of the plate cylinder, said means for axially moving said chuck comprises a nut secured to said housing, means meshed with said nut for moving said spindle mounted in said housing in the axial direction for selectively engaging and disengaging said chuck from the drive element of the plate cylinder, said means meshed with said nut comprises a first spur gear, a hub on said spur gear in threaded engagement with said nut, a second spur gear engaged with and arranged to drive said first spur gear, and means drivingly connected to said second spur gear so that as said first spur gear is driven said hub thereof in threaded engagement with said nut displaces said spindle with the chuck secured thereto between the opened and closed positions thereof.

2. A coupling device as set forth in claim 1, wherein said means disposed at the opposite end of the bore comprises a connector member attached to said spindle, a pneumatic cylinder attached to said connector member and arranged for rotation with said spindle, said pneumatic cylinder arranged to supply compressed air into the adjacent end of the bore within said spindle, means for controllably supplying compressed air to said pneumatic cylinder, whereby the end of said rod in said bore adjacent said pneumatic cylinder acts as a piston and in response to the compressed air supplied thereto said rod selectively displaces said chuck into its opened and closed positions.

3. A coupling device as set forth in claim 1, wherein said means for driving said second spur gear comprises a motor arranged for high speed and for fine adjustment operation, a shaft interconnecting said motor and said second spur gear, whereby as said second spur gear is rotated by said motor it drives said first spur gear which in turn through its hub moves the drive housing and the chuck secured thereto in the axial direction.

References Cited
UNITED STATES PATENTS

| 926,761 | 7/1909 | Oliver | 279—4 |
| 1,299,883 | 4/1919 | Warren | 279—4 |
| 2,075,192 | 3/1937 | George. | |
| 2,471,863 | 4/1949 | Church. | |

JAMES A. WONG, Primary Examiner

U.S. Cl. X.R.
279—4